United States Patent
Kishinsky et al.

(10) Patent No.: US 6,286,033 B1
(45) Date of Patent: Sep. 4, 2001

(54) METHOD AND APPARATUS FOR DISTRIBUTING COMPUTER INTEGRATED TELEPHONY (CTI) SCRIPTS USING EXTENSIBLE MARK-UP LANGUAGE (XML) FOR MIXED PLATFORM DISTRIBUTION AND THIRD PARTY MANIPULATION

(75) Inventors: Konstantin Kishinsky, San Carlos; Nikolay Anisimov, Walnut Creek; Gregory Pogossiants, Palo Alto; Pavel Postupalski, Walnut Creek, all of CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 09/561,139

(22) Filed: Apr. 28, 2000

(51) Int. Cl.[7] .............................. G06F 17/27; G06F 17/50; G06F 15/16
(52) U.S. Cl. .................... 709/203; 709/302; 709/303; 707/10; 703/13; 379/90.01
(58) Field of Search .............................. 703/13; 709/203, 709/302, 303; 707/10; 379/90.01

(56) References Cited

U.S. PATENT DOCUMENTS 5,884,032 * 3/1999 Bateman et al. ...................... 709/204
5,940,075 * 8/1999 Mutschler, III et al. ............. 345/335
6,005,845 * 12/1999 Svennesson et al. ................ 370/260
6,173,316 * 1/2001 De Boor et al. ...................... 709/218
6,205,412 * 3/2001 Barskiy et al. ....................... 703/13

* cited by examiner

*Primary Examiner*—Krisna Lim
(74) *Attorney, Agent, or Firm*—Donald R. Boys; Central Coast Patent Agency, Inc.

(57) ABSTRACT

A network-based system for distributing object-oriented CTI scripts is provided. The system includes, at least one source communication center enabled with an object-oriented-programming-system for generating and distributing the CTI scripts, at least one receiving communication center enabled with an object-oriented-programming-system for receiving and implementing the CTI scripts, an instance of a descriptor-language-converter application installed and operational within the source communication center and an instance of the descriptor-language-converter application installed and operational within receiving communication center. The source center creates the CTI script using its own object-oriented-programming-system, converts the object-oriented script into a descriptor language using the descriptor-language-converter, and distributes the descriptor-language script over the network and, wherein the receiving communication center receives the descriptor-language script and interpreting the language, regenerates a version of the original CTI script using its own object-oriented-programming-system. In preferred embodiments, XML language is used as the descriptor-language. In other embodiments, other descriptor languages may be used.

17 Claims, 2 Drawing Sheets

Distribution and Implementation

METHOD AND APPARATUS FOR DISTRIBUTING COMPUTER INTEGRATED TELEPHONY (CTI) SCRIPTS USING EXTENSIBLE MARK-UP LANGUAGE (XML) FOR MIXED PLATFORM DISTRIBUTION AND THIRD PARTY MANIPULATION

FIELD OF THE INVENTION

The present invention is in the area of telephony call-center technology, and pertains more particularly to methods of expressing object oriented CTI scripts in a standard mark-up language so that they may be distributed and manipulated in a more platform independent manner.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here as to do so would obscure the facts and teaching of the invention.

One document which provides considerable information on intelligent networks is "ITU-T Recommendation Q. 1219, Intelligent Network User's Guide for Capability Set 1", dated April, 1994. This document is readily available to the skilled artisan, and is incorporated herein by reference.

At the time of filing the present patent application there continues to be remarkable growth in telephone call-center systems, and several manufacturers and service providers are developing and introducing systems with enhanced functionality, principally through what is known in the art as computer-telephony integration (CTI). CTI systems are typically based on telephony switches connected by what are known as CTI links to relatively powerful computer processors executing telephony applications. As is known in the art, conventional telephony switches are electronic systems operating partly with computer hardware and software with a functionality set generally unique to the manufacturer and model of the individual switch. Many telephony switches have at least one external communication port known in the art as a CTI port, which adapted to connect to an external computer processor, and it is via this connectivity that CTI is accomplished.

Generally speaking, a CTI-enhanced telephony switch has a processor connected by a CTI link to the switch, and the processor is adapted to execute telephony CTI applications to monitor and direct activity of the switch. New invention of CTI-enhanced systems is limited only by the power of the computers used and the imagination and creativity of the technical people who invent new telephony systems through creating unique CTI applications.

The usual purpose of a call-center, as is known in the art, is to connect agents representing the sponsoring enterprise (owner, operator) of the call center with members of the public (people interested in accessing the services of the call center). Typically a call center is based, as described above, on at least one telephony switch to which agent stations are connected typically by extension lines and directory numbers, and to which incoming and outgoing trunk lines may carry telephone calls between the switch and the calling-in parties. In addition, most modern, high-capacity call centers have agent stations which include computer platforms (such as personal computers) equipped with video display units (PC/VDU), and the PC/VDU platforms are interconnected, usually by a local area network (LAN). There may also be servers of various sorts for various purposes on the LAN, and the LAN may also be connected to a CTI server in turn connected to the central switch through a CTI link.

In more recent contributions to the art of telephony, Data Network Telephony (DNT) has been integrated into the call-center environment. Internet Protocol (IP) telephony, a sub-set of DNT, is one of many common applications now practiced in many CTI call centers. A CTI call center enhanced with DNT capability has connection to a Wide-Area-Network (WAN), which most often is the well-known Internet network. Therefore, Connection-Orientated-Switched-Telephony (COST) calls may arrive from a telephone network and IP telephony events may arrive from network-connected clients. These dual-capable call centers are often termed communication centers because of the added media types that agents are responsible for handling.

In a call center communication flow there are typically numerous decision points, at which the flow of interaction may take one or another of divergent paths. Given a call center wherein agent stations include LAN-connected PC/VDU equipment and CTI-enhancement, an opportunity presents itself for directing activity of agents in a particularly efficient way. That is, scripts may be prepared for agent activity, for hardware activity (call switching and so forth), and even for interaction of agents with clients and hardware. The scripts may be maintained in, for example, a server on the LAN connecting agent's PC/VDU platforms, and direction may be thus provided to agents and activities of a call center before, during, and after calls with clients.

In conventional art, scripts are provided, as described above, from pre-programmed sources to agents through associated PC/VDU platforms. In providing scripts, it is necessary for a scripter (a programmer who writes and/or programs scripts) to analyze all of the transactions that might take place between an agent and a client, including what might be termed machine activity, such as switching a client's call from one agent to another, or to a source of preprogrammed audio, video, or textual information.

Scripts are programmed typically in a relatively high-level programming language. The complexity of a call-center presents a challenge for any programming facility. Moreover, as with any other sort of programming, when a bug appears, or when a change is made in the purpose or functionality of a call center, or portion of call-center operations, it is necessary to laboriously rewrite usually a significant number of scripts. This endeavor is no shallow task, and may take a considerable time. Moreover such reprogramming presents numerous opportunities for error, both in programming as well as in the layout and content of the effected scripts.

In more recent contributions to the art as known to the inventor, much simplicity is achieved in scripting within a call center by introducing object-oriented-scripting-programming (OOPS) technology into the CTI call-center environment. This form of programming relies on memory objects expressed in binary form that describe an object, which may represent a state of an agent, a piece of equipment, a function, or any other graphical representation. By dragging and dropping objects into an object container (application) a programmer can create any type of call center script as long as the integral "objects" are defined. In this way scripts providing call center function may be distributed to various portions of the overall system for quick and efficient execution. OOPS simulations or models may also be created for functional analytic purposes. One example of object modeling of call center functionality known to the present inventors and a subject of other patent applications known to the inventors uses Petri Net theory. The fundamentals of Petri Nets are well-known, and fairly presented in the book "Petri Net Theory and the Modeling of Systems", by James L. Peterson of the University of Texas at Austin. This book is published by Prentice-Hall, Inc. of Englewood Cliffs, N.J., and is incorporated herein by reference.

Various companies have proprietary systems and methods for creating and distributing call-center scripts based on object oriented programming. One known to the inventor is termed Nirvana™ scripting. One key feature of Nirvana™ is that it employs visual scripting for rapid application development that is supported by a Script Editor and Engine (SEE). Visual scripting language is used to describe control flow for enabling designers to represent parallelism, synchronization, asynchrony, and exceptions-handling in CTI applications.

It is desirable, when providing object-oriented scripts, to facilitate third parties for testing, modeling and correcting errors. With the advent of DNT integration into CTI call centers, it has also become desirable to provide a means for distributing object-oriented scripting to other call centers. The only way to facilitate third-party editing or application distribution to other WAN-connected call centers is to develop a formal representation of a descriptor language (DL) so that such representations may be distributed and utilized.

Several companies known to the inventor have proprietary solutions classified generally as application generation (AG) tools, which are textual representations of AG languages that facilitate third party entry into the process and application generation at distribution sites. These are textual representations of CTI or script-based AG tools. Known commercial applications of these AG tools include FAR Voice™ by FAR System™ from Mediasoft Telecom™, Visual Voice™ from Stylus Innovations™, and Vocal Point™ by Syntellect™, etc.

Because disparate call centers may have different hardware configurations and different platforms (operating environments), it becomes difficult to facilitate CTI solutions that are usable in a practical and efficient manner. In order to distribute usable CTI scripts to a plurality of system-varied centers, the centers must acquire source-compatible software and in some cases hardware. That is to say that distributed scripts are usable at distribution sites and editable by third parties only if software used to attain functionality (generate the applications) is provided by the source. For example, third parties and distribution sites must have AG tools developed by or supported by the source. Furthermore, objects are memory dependent and often require like computer environments to be transmitted and received successfully.

What is clearly needed is a method of textualizing and distributing object-oriented scripts to call-centers that does not depend on the use of a proprietary descriptor language (DL) or inclusion of memory dependent objects. Such a method would allow distribution and generation of object-oriented CTI applications to be performed in a more platform-independent manner to disparate call centers.

SUMMARY OF THE INVENTION

In a preferred embodiment of the present invention, a network-based system for distributing object-oriented CTI scripts is provided. The network-based system comprises, at least one source communication center enabled with an object-oriented-programming-system for generating and distributing the CTI scripts, at least one receiving communication center enabled with an object-oriented-programming-system for receiving and implementing the CTI scripts, an instance of a descriptor-language-converter application installed and operational within the source communication center and an instance of the descriptor-language-converter application installed and operational within receiving communication center.

The system is characterized in that the source center creates the CTI script using its own object-oriented-programming-system, converts the object-oriented script into a descriptor language using the descriptor-language-converter, and distributes the descriptor-language script over the network, wherein the receiving communication center receives the descriptor-language script and interpreting the language, regenerates a version of the original CTI script using its own object-oriented-programming-system.

In preferred uses, the network is the Internet network, wherein the descriptor language is XML and the descriptor-language-converters are XML converter applications. The instances of XML converter applications are integrated with respective object-oriented-programming-systems within each source and receiving communication center.

In one aspect, a centralized XML server is provided in the network for storing distributed CTI scripts described in XML language for download by receiving centers. Also in one aspect, the descriptor language may be one of a family of XML languages.

In another aspect of the present invention, a software driver for reading and writing XML descriptor-language describing object-oriented CTI scripts is provided. The software comprises, an XML writer for expressing object-oriented CTI scripts in the form of XML, an XML reader for interpreting object-oriented CTI scripts expressed in the form of XML, and an application-programming-interface for interfacing the software driver to an object-oriented-programming-system. The software driver creates and distributes an XML version of the object-oriented CTI script created by the object-oriented-programming-system, wherein the driver interprets a received XML version of the object-oriented CTI script, and in conjunction with the object-oriented programming system, generates the object-oriented CTI script.

In a preferred embodiment, the software driver uses a universal document-type-definition to both interpret and to write XML versions of CTI object-oriented scripts, wherein the document-type-definition contains the description of functional objects of both source communication centers and receiving communication centers.

In one aspect, the data-network-telephony scripts are created, distributed, and interpreted instead of CTI scripts. In another aspect, both CTI scripts and data-network-telephony scripts are created, and interpreted. In still another aspect, only CTI scripts are created and interpreted.

In still another aspect of the present invention, a method for sharing object-oriented CTI scripts between disparate communication centers is provided. This method includes steps, (a) creating or providing an object-oriented script generated by an object-oriented programming system at a source center, (b) converting the object-oriented script into a platform-independent descriptor language, (c) distributing the descriptor language from the source center to a receiving center over a communications network, (d) receiving the descriptor language at the receiving center over the same network; and (e) regenerating an object-oriented script using the object-oriented programming-system.

In one aspect of the above-described method, in step (b), the platform-independent descriptor language is of the form of XML. In another aspect of the method, in step (c), the receiving center is an XML file server. In yet another aspect of the method, an additional step is added between (c) and (d) for pulling the XML descriptor language from the XML file server.

Now, for the first time, a network-based system for distributing object-oriented CTI scripts is provided that is platform independent by virtue of the use of a universal descriptor language wherein all applicable memory objects generic to receiving centers are pre-known. The method and apparatus of the present invention is described in various embodiments presented below.

BRIEF DESCRIPTION OF THE DRAWING FIGURES

DESCRIPTION OF THE PREFERRED EMBODIMENTS

Figure 1:
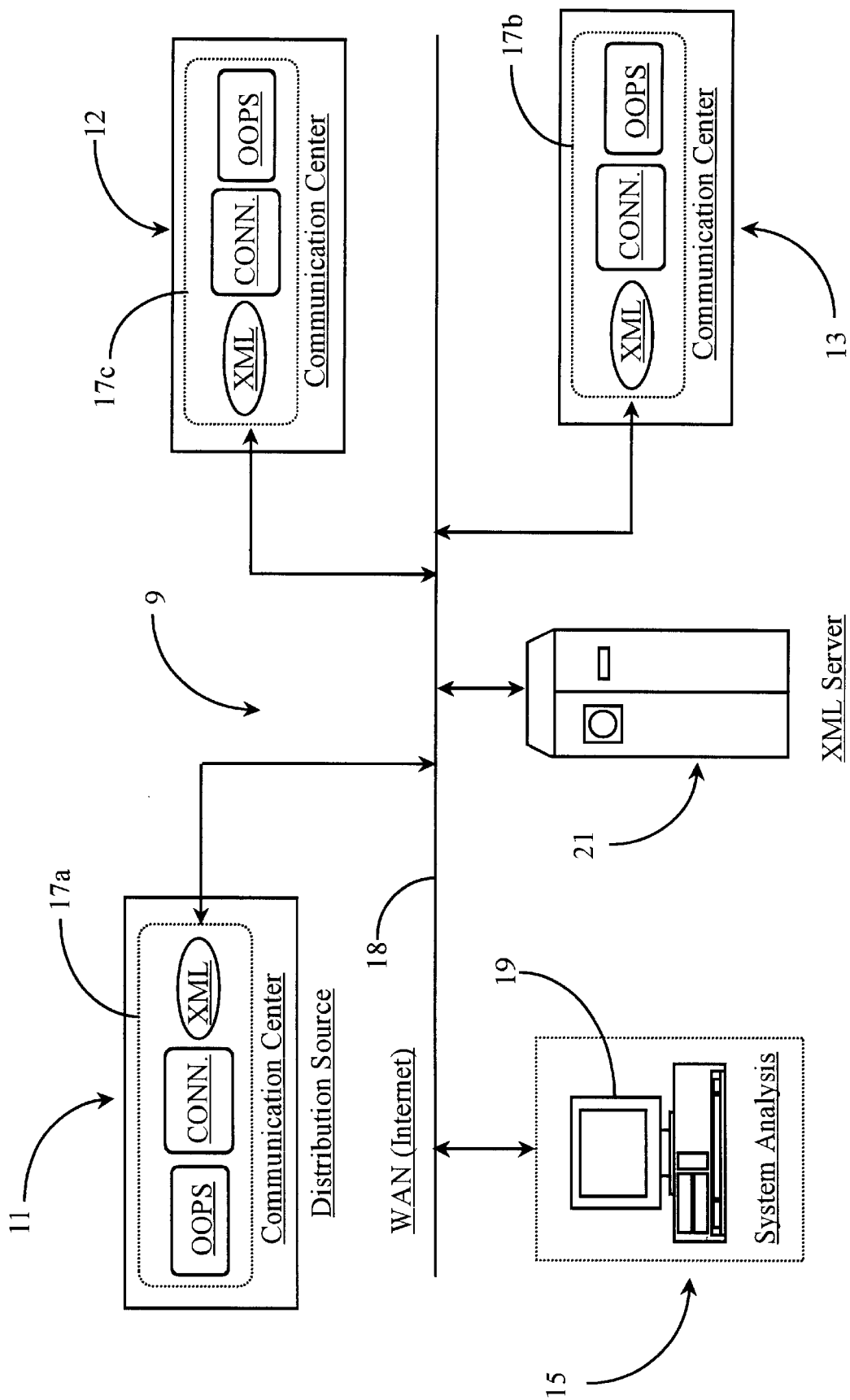
FIG. 1 is a block diagram illustrating a distribution network comprising WAN-connected communication centers practicing a method of application representation and distribution according to an embodiment of the present invention.

FIG. 1 is a block diagram illustrating a distribution network 9 comprising WAN-connected communication centers 11–13 practicing a method of CTI application representation and distribution according to an embodiment of the present invention. Network 9 comprises a Data-Packet-Network (DPN), which is, in this embodiment, the Internet network. Network 9 may be a WAN other than the Internet as long as appropriate data-transfer-protocols are supported. Examples of applicable WANs other than the Internet would encompass both corporate and private networks. The inventor chooses the Internet network as distribution network 9 because of its accessibility and because it already supports the data transfer protocols required for practice of the present invention.

Network 9 is exemplified by an Internet backbone 18, which represents all of the lines and connection points that make up the Internet network as a whole including connected sub-networks as may be known in the art. Therefore, there is no geographic limit or formal network boundary for practicing the present invention.

In this example, communication centers 11–13 are illustrated as having Internet connection to backbone 18 and therefore included within the scope of distribution network 9. Internet connection to backbone 18 may be of any known means including dial-up or continuous connections using appropriate access lines and services. The term communication center replaces the term call center hereinafter in this specification because of expanded multi-media handling performed at such state-of-the-art centers. Communication centers 11–13 may be thought of as CTI-enhanced call-in centers with additional capability of handling Internet-sourced or IP telephony calls and other electronic documents. Therefore, each center may be assumed to contain all of the equipment types described in the background section with regards to CTI-processors and servers, and other equipment types and capabilities known to exist in state-of-the-art communication centers. Such equipment types include but are not limited to Interactive Voice Response (IVR) units, automated fax systems, Customer Information Systems (CIS), IP data routers, e-mail routing systems, and so on.

In this example, center 11 is defined as a source center that distributes object-oriented CTI scripts to centers 12 and 13, and by inference to many other centers as well. A central file/data server 21 is illustrated as connected to backbone 18 and participating in network 9. Server 21 is adapted as an XML server. Server 21 contains XML representations of CTI scripts created within center 11 and stores them for access by centers 12 and 13. Any of centers 11–13 may serve as an application source-center. The inventor chooses center 11 for exemplary purpose only. Similarly, there may be many more than three communication centers connected to and participating in distribution network 9 without departing from the spirit and scope of the present invention. However, all that is required to practice distribution in network 9 is two communication centers.

In one embodiment, a distributing entity may not be an actual communication center practicing the art of CTI telephony. In these alternate cases, the distributing entity may instead be a dedicated application source, testing and distribution facility.

A knowledge center 15 represents a remote testing facility having at least one manned workstation, illustrated in this example by a computer icon 19. Knowledge center 15 is illustrated as connected to backbone 18 by virtue of Internet connection as described with communication centers 11–13.

In one embodiment of the invention, knowledge center 15 may be resident within and a functional part of one or all of communication centers 11–13. The purpose of center 15 is to analyze communication-center scripts for accuracy and functionality within the scope of a dedicated testing facility. Center 15 may have one workstation resident therein as is illustrated in this example, or it may have many resident workstations having similar capabilities. Only one workstation 19 is illustrated in this example and deemed sufficient for teaching of the present invention. Knowledge center 15 may be assumed to be a third party as described in the background section.

Communication center 11 comprises, among other utilities, a software suite 17a, which is adapted for creating and implementing communication center functionality. A good example of an applicable software suite is the Nirvana™ suite mentioned in the background section and known to the inventor. Centers 12 and 13 utilize similar software suites for creating and implementing their own internal communication center functionality. These are represented as suites 17b and 17c respectively. It is important to note here that the functional CTI software and hardware exhibited by centers 11–13 does not have to be of the same manufacturer or provider. In fact, all three centers may use equipment types and software suites that, for general purposes, are foreign to one another in terms of interoperability. The term disparate as used earlier in this specification describes this arrangement.

It is a goal of the present invention is to facilitate interoperability between centers 11–13 with regard to distributed or shared CTI applications. For example, each provided software suite 17a–17c comprises an object-oriented-programming-system (OOPS). Each instance of OOPS may follow different rules and protocol than other illustrated instances. The basic function of each illustrated instance of OOPS is to provide a method for creating object-oriented CTI scripts for controlling communication center operations.

In order for communication centers 11–13 to share and distribute object-oriented CTI scripts with each other in current art, each illustrated instance of OOPS must be compatible with or supported by other instances in terms of rules and protocol. Similarly, objects defined by the OOPS in each system must be identical or within a supported range of objects allowed by a proprietary protocol. Moreover, a proprietary DL must be used to describe the objects for distribution purposes.

In this example, it is assumed that software and hardware configurations attributed to centers 11–13 are not identical. For example, objects created and defined by the OOPS of suite 17a in center 11 may not be identical in definition or available functionality as objects created and defined by the OOPS of suite 17c in center 13 and so on. Distributing functional CTI applications created, for example, in center 11 to center 13 would be extremely difficult in current art. A means of software and hardware integration would have to be provided for both systems to share and distribute CTI applications to each other. In some cases, hardware and operating systems may have to be modified to insure compatibility.

In order to achieve integration and compatibility between centers 11–13 without requiring substantial software and/or hardware modification, the inventor provides a unique connector (CONN.) described as an SEE extension that is adapted to read and write in XML. XML is a standard mark-up language developed by the World Wide Web Consortium (W3C). Much information regarding the XML standard is published and available to the skilled artisan.

One CONN is illustrated in each suite 17a, 17b, and 17c. A CONN is further defined in this specification as interfacing extension or hardware-enabled driver that interfaces with a SEE generic to the OOPS utilized in each center. For example, in center 11, suite 17a has an OOPS that defines and stores created objects during the process of creating new object-oriented CTI scripts. The CONN. in suite 17a allows the parameters of these objects to be described in XML, which is a standard and platform-independent language known in the art and available to the inventor. CONN. instances in suite 17b and in suite 17c function likewise to interface with respective OOPS SEEs.

As per the above description, it can be seen now that each communication center 11–13 has the ability to convert object-oriented scripts into XML and upload the XML scripts onto network 9 through backbone 18, which is the Internet in this example. This process is entirely automated. As is known in the art, a document-type-definition (DTD) accompanies an XML file in transit over a DPN. A DTD describes how data is to be organized and presented or used on a receiving system. In this example, there is a controlling or source/distribution center described earlier in this specification as center 11.

In order for center 11 to provide object-oriented scripts to function in centers 12 or 13, it only has to have knowledge of the objects specific to each receiving center as defined by existing instances of OOPS at each center. Therefore, as an application creator and distributor, center 11 creates a DTD that contains all of its objects, all of the objects of center 12, and all of the objects of center 13. In this way, a universal DTD exists that provides instruction for application generation at the receiving end that is suitable with the platform used at the receiving end. It is noted herein that a distributing center may create an application and distribute it directly to a target center connected to network 9. However, in this example, it is preferred that server 21 manages distribution of the XML scripts to centers 12 and 13, and to other connected centers not shown.

In practice of the present invention, assume that center 11 hosts center 12 and center 13. In this case, center 11 will provide CTI scripts for application at centers 12 and 13. It is assumed in this case that all three centers have differing OOPS protocols, and defined objects as described above. Center 11 first creates a DTD containing its own objects as well as the objects available in the OOPS of center 12 and center 13. Center 11 can now create an object-oriented CTI application using its own OOPS and convert it to XML by virtue of its CONN. using the universal DTD containing the objects of centers 12 and 13 as a subset. The XML script created is a text or "flat file" that does not contain memory objects and is therefore platform independent. The XML script is uploaded into server 21 from whence it can be accessed by centers 12 and 13, and by station 15.

Suites 17b and 17a read the XML script by virtue of CONN. instances and generate the CTI application using the accompanying DTD, which contains their system-specific objects. As a result, center 12 and center 13 may generate the CTI application from XML script, each using their own OOPS for implementation in their respective environments.

System center 15 may be utilized for analyzing and testing CTI scripts from server 21 before they are made available to designated centers, or at other times as well. In this regard, center 15 would have an OOPS simulation and modeling system, a SEE and a CONN. (components not shown). As previously described, center 15 may be incorporated as an internal-applications testing facility inside one or all of centers 11–13. In this embodiment, center 15 functions from a remote location and may intercept and perform third party analysis of scripts destined to any receiving center.

One with skill in the art of Petri-Net theory and application, and XML representation of objects will appreciate that virtually any type of object-oriented CTI script may be expressed as a form of XML for transportation over a DPN. XML versions of distributed scripts may be interpreted according to appropriate DTD parameters. At receiving centers, the CTI applications may be generated from XML description to produce object-oriented applications that are ready for installation using OOPS generic to the receiving center. Also, the method and apparatus of the present invention may be practiced with virtually any existing OOPS system and is not limited to Nirvana™ script.

Figure 2:
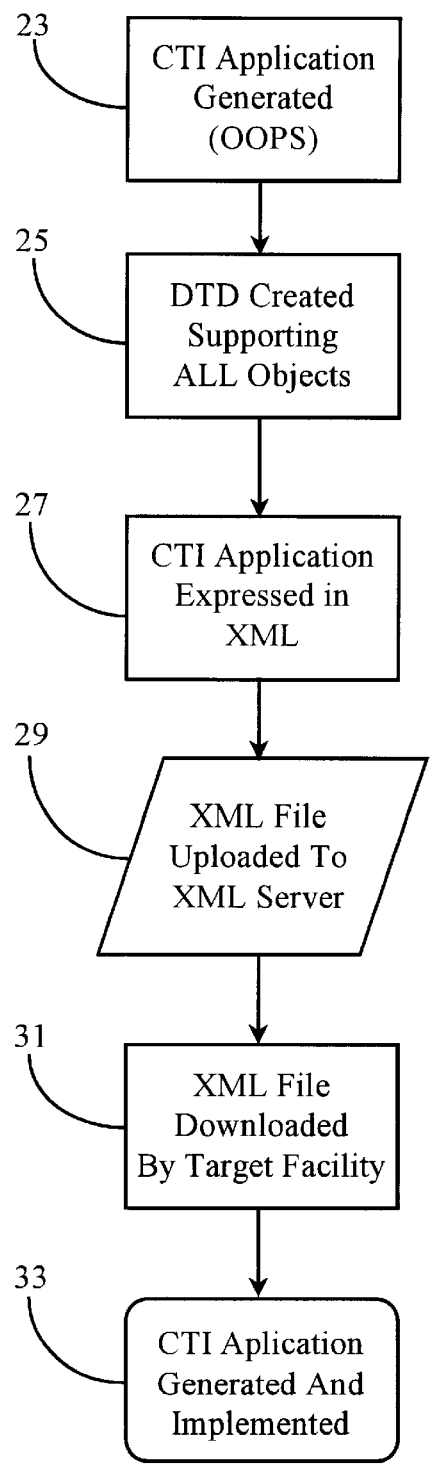
FIG. 2 is a flow diagram illustrating steps for generation and distribution of scripts according to an embodiment of the present invention.

FIG. 2 is a flow diagram illustrating steps for generation and distribution of object-oriented scripts according to an embodiment of the present invention. In step 23, an object-oriented CTI application is generated at a source facility using a generic OOPS. A DTD is then created that contains all of the object parameters specific to the application and defined by the OOPS in step 25. Also included in the DTD of step 25 are the appropriate object parameters of equivalent objects defined by OOPS within receiving facilities that will receive and generate the created CTI application.

It is important to note here that an object-oriented CTI application may comprise only one script, or a plurality of separate scripts designed to perform as one routine. Therefore, a DTD may contain only those object parameters required to execute a routine. In another embodiment, a universal DTD may be created that contains all of the object parameters of the creating facility as well as all of the object parameters of the receiving facility or facilities. In this way one universal DTD may be used for separate CTI applications.

In step 27, the created CTI application is written as an XML "flat file" at the creating facility by virtue of a CONN. described in FIG. 1. The XML contains all of the description required for successful implementation at a receiving facility with the DTD providing appropriate object parameters.

In step 29 the XML file representing the created CTI application is uploaded to a WAN-connected server, which is analogous to XML server 21 of FIG. 1, and made available to a target facility or facilities. The term facility as used in this example is analogous to communication center as used in FIG. 1. However, a source facility may or may not be an actual communication center.

In step 31, the XML file representing the created CTI application is downloaded from the WAN-connected server by a target facility. In one embodiment, XML files representing created CTI applications may be distributed directly to target facilities. However, because one application may be used in a plurality of disparate facilities, it is preferred that such facilities "pull" their files from a central location on the network.

At step 33, the XML file representing the created application is read by virtue of a CONN. in a target facility and an object-oriented CTI application is generated and installed by an existing OOPS using the XML instruction and associated DTD guidelines for appropriate objects.

It will be apparent to one with skill in the art that the process flow represented herein comprises basic steps and should be considered exemplary only of a basic order of steps involved in application creation, XML expression, XML interpretation, and generation of the application at the receiving end based on XML instruction. In one embodiment, additional steps may be inserted to allow for third party testing of a generated CTI application before implementation within a target facility.

In still another embodiment, it is possible that a CTI application may be created that includes DNT functionality such that there is a CTI implementation and a DNT implementation for the routine or string of routines characterized by the application. If a receiving facility is a CTI-only center then it may ignore the DNT version of the application. If the receiving center is a DNT only center, then it may ignore the CTI version of the application. If the receiving facility is a dual capable facility, then it may incorporate both versions of the application.

The method and apparatus of the present invention allows one object-oriented CTI application to be sent to and utilized by a plurality of disparate communication centers without requiring special hardware, software, or a proprietary DL. All that is required of each participating facility is that their OOPS objects be defined and included in a DTD at the source, and that they are capable of receiving and interpreting XML and using the information in their OOPS for generating object-oriented application.

It will also be apparent to one with skill in the art that an application creating facility may be created that provides CTI solutions to clients defined as the receiving facilities connected to network 9. In this case, the source facility would design solutions, test them for operability and integrity, and distribute them to clients as needed. There are many possibilities. Therefore, the spirit and scope of the present invention should be afforded the broadest scope under examination. The spirit and scope of the present invention is limited only by the claims that follow.

What is claimed is:

1. A network-based system for distributing object-oriented CTI scripts comprising:
   at least one source communication center enabled with an object-oriented-programming-system for generating and distributing the CTI scripts;
   at least one receiving communication center enabled with an object-oriented-programming-system for receiving and implementing the CTI scripts;
   an instance of a descriptor-language-converter application installed and operational within the source communication center; and
   an instance of the descriptor-language-converter application installed and operational within receiving communication center, characterized in that the source center creates the CTI script using its own object-oriented-programming-system, converts the object-oriented script into a descriptor language using the descriptor-language-converter, and distributes the descriptor-language script over the network and, wherein the receiving communication center receives the descriptor-language script and interpreting the language, regenerates a version of the original CTI script using its own object-oriented-programming-system.

2. The system of claim 1, wherein the network is the Internet network.

3. The system of claim 2, wherein the descriptor language is XML and the descriptor-language-converters are XML converter applications.

4. The system of claim 3, wherein the instances of XML converter applications are integrated with respective object-oriented-programming-systems within each source and receiving communication center.

5. The system of claim 4, wherein a centralized XML server is provided in the network for storing distributed CTI scripts described in XML language for download by receiving centers.

6. The system of claim 4, wherein the descriptor language is one of a family of XML languages.

7. A software driver for reading and writing XML descriptor-language describing object-oriented CTI scripts comprising:
   an XML writer for expressing object-oriented CTI scripts in the form of XML;
   an XML reader for interpreting object-oriented CTI scripts expressed in the form of XML; and
   an application-programming-interface for interfacing the software driver to an object-oriented-programming-system.

8. The software driver of claim 7, wherein the driver creates and distributes an XML version of the object-oriented CTI script created by the object-oriented-programming-system.

9. The software driver of claim 8, wherein the driver interprets a received XML version of the object-oriented CTI script, and in conjunction with the object-oriented programming system, generates the object-oriented CTI script.

10. The software driver of claim 9, wherein the driver uses a universal document-type-definition to both interpret and to write XML versions of CTI object-oriented scripts.

11. The software driver of claim 10, wherein the document-type-definition contains the description of functional objects of both source communication centers and receiving communication centers.

12. The software driver of claim 11, wherein data-network-telephony scripts are created, distributed, and interpreted instead of CTI scripts.

13. The software driver of claim 11, wherein both CTI scripts and data-network-telephony scripts are created, and interpreted.

14. A method for sharing object-oriented CTI scripts between disparate communication centers comprising the steps of:
  (a) creating or providing an object-oriented script generated by an object-oriented programming system at a source center;
  (b) converting the object-oriented script into a platform-independent descriptor language,
  (c) distributing the descriptor language from the source center to a receiving center over a communications network;
  (d) receiving the descriptor language at the receiving center over the same network; and
  (e) regenerating an object-oriented script using the object-oriented programming-system.

15. The method of claim 14 wherein in step in (b), the platform-independent descriptor language is of the form of XML.

16. A method of claim 15 wherein in step (c), the receiving center is an XML file server.

17. The method of claim 16 wherein an additional step is added between (c) and (d) for pulling the XML descriptor language from the XML file server.

* * * * *